(12) United States Patent
Yao (10) Patent No.: US 11,220,653 B2
(45) Date of Patent: Jan. 11, 2022

(54) PHOTOCATALYSIS EXTRACTION METHOD FOR ENRICHING CANNABIDIOL FROM THE WILD HEMPS

(71) Applicant: Hang Yao, Seattle, WA (US)

(72) Inventor: Hang Yao, Seattle, WA (US)

( * ) Notice: Subject to any disclaimer, the term of this patent is extended or adjusted under 35 U.S.C. 154(b) by 0 days.

(21) Appl. No.: 16/992,540

(22) Filed: Aug. 13, 2020

(65) Prior Publication Data
US 2021/0047583 A1    Feb. 18, 2021

Related U.S. Application Data (60) Provisional application No. 62/886,125, filed on Aug. 13, 2019.

(51) Int. Cl.
*C11B 3/02* (2006.01)
*B01J 35/04* (2006.01)
(Continued)

(52) U.S. Cl.
CPC ............ *C11B 3/02* (2013.01); *B01J 35/04* (2013.01); *C11B 1/04* (2013.01); *C11B 1/106* (2013.01);
(Continued)

(58) Field of Classification Search
CPC ... C11B 3/02; C11B 3/006; C11B 1/04; C11B 1/106; B01D 9/0013; B01J 35/04; B01J 21/063
See application file for complete search history.

(56) References Cited

U.S. PATENT DOCUMENTS

2016/0228385 A1    8/2016  Sievers et al.
2019/0241536 A1*   8/2019  Durkacz .............. C07C 37/70
(Continued)

FOREIGN PATENT DOCUMENTS

CN    107337586 A    11/2017
EP    1542952 A1    6/2005
(Continued)

OTHER PUBLICATIONS

Precision Extraction Solutions, Ultimate Guide to Producing Hemp and Cannabis Extract, [Retrieved on Jul. 15, 2019], Retrieved from the Internet <URL: https://precisionextraction.com/2018/07/ultimate-cannabis-extraction-guide/>, 1 page.
(Continued)

*Primary Examiner* — Yate' K Cutliff (57) ABSTRACT

A novel method is developed to remove wax and terpene from the wild hemp plants to produce enriched cannabidiol (CBD) crude oil with high quality and further purify the crude oil into crystal/isolate with 99.0% content of CBD. The method utilizes titanium dioxide ($TiO_2$) photocatalyst for redox reaction under the irradiation of UV (ultraviolet) light in a solvent extraction process of CBD, which significantly removes accompanying wax and terpene. With the beneficial photocatalyst property, the $TiO_2$ decomposes the wax and terpene in the wild hemp crude extract through appropriate UV radiation to induce catalytic reaction at specific PH (potential hydrogen) levels. Through optimizing the photocatalyst dewaxing using $TiO_2$, the method achieves the best dewaxing effect and maximum terpene reduction. Thus, the method offers a low-cost, reusable, and biologically friendly process of removing wax and terpene to maximize the efficiency and effectiveness of the separation processes in the CBD production.

15 Claims, 12 Drawing Sheets

(51) Int. Cl.
  *C11B 1/04* (2006.01)
  *C11B 3/00* (2006.01)
  *C11B 3/12* (2006.01)
  *C11B 1/10* (2006.01)
  *B01J 21/06* (2006.01)

(52) U.S. Cl.
  CPC ............... *C11B 3/006* (2013.01); *C11B 3/12* (2013.01); *B01J 21/063* (2013.01)

(56) References Cited

U.S. PATENT DOCUMENTS

2020/0056115 A1* 2/2020 Vanaman ............... B01D 5/006
2020/0339528 A1* 10/2020 Moorehead .......... C07D 311/78

FOREIGN PATENT DOCUMENTS

WO    WO2004026802 A1    4/2004
WO    WO2009064151    *    5/2009    ........... A61K 36/185

OTHER PUBLICATIONS

Golami, Atena; Abbaspour, Hossein; Hashemi-Moghaddam, Hamid; Gerami, Mahyar. Photocatalytic Effect of $TiO_2$ Nanoparticles on Essential Oil of Rosmarinus Officinalis, Journal of Biochemical Technology; Komatipalli vol. 9, Iss. 4, (2018): 50-54.

Kumar, J., Bansal, A., Photocatalysis by Nanoparticles of Titanium Dioxide for Drinking Water Purification: A Conceptual and State-of-Art Review, MSF 764, p. 130-150, Jul. 2013.

* cited by examiner

PHOTOCATALYSIS EXTRACTION METHOD FOR ENRICHING CANNABIDIOL FROM THE WILD HEMPS

The current application claims a priority to the U.S. Provisional Patent application Ser. No. 62/886,125 filed on Aug. 13, 2019.

FIELD OF THE INVENTION

The present invention relates generally to methods of oil extraction from biomass. More specifically, the present invention relates to an innovative method and process that extracts cannabidiol (CBD) oil from wild hemps including Da Hingan Ling wild hemps using photocatalysis to achieve high quality, high purity, and high throughput of the CBD oil.

BACKGROUND OF THE INVENTION

Hemp, typically grown in the northern hemisphere, is a strain of the *Cannabis sativa* plant species. The derived products of the industrial hemps have been used for variety fields of food, fiber, and medicine etc. widely. To date, plentiful hemp varieties are nurtured by means of breeding. In accordance with different applications, hemp plants can be classified into fibrous hemp and drug-type hemp depending on the ratio of the primary cannabidiol (CBD) and $\Delta^9$-tetrahydrocannabinol ($\Delta^9$-THC). The fibrous hemps (industrial hemp) generally have less than 0.3% $\Delta^9$-THC, and CBD is a major component among hundreds of complex compounds (CBD, CBG, CBC, CBDN, and CBCN, etc.) found in industrial hemps. In contrast, the drug-type hemps usually have higher levels of psychoactive $\Delta^9$-THC ($\geq 2\%$). Therefore, industrial hemps contain less than 0.3% $\Delta^9$-THC, while the drug-type hemps for medicinal or recreational application could contain $\Delta^9$-THC with the range from 2% to over 20%. The Da Hinggan Ling wild hemp grows in the area of primeval forest in the Da Hinggan Ling district, located in the northernmost end of China. The stock height is usually 2-4 meters with 230 days of the growth period, having strong lodging resistance and drought resistance properties. The Da Hinggan Ling wild hemp is found to be rich of CBD (12%-18%) especially in flower and stem parts. The Da Hinggan Ling wild hemp, however, contains much more wax, terpene and chlorophyll than most commercial hybrid hemps, which increases the difficulty for the extraction of CBD.

In recent years, a giant interest into CBD component has emerged owing to its versatile beneficial functions for human such as the pain relief, coping the stress as well as anxiety, sleep improvement and anti-inflammation etc. CBD also possesses great potential to be used in food industry as supplement. However, the efficiency for existing CBD extraction methods is low and the associated purifying technology still needs improvement for desired high CBD content of the compound. In order to improve the efficiency of conventional CBD extraction processes, distillation and/or chromatography methods have been used. One of the crucial factors influencing the efficiency of CBD separation in these methods is the accompanying wax with hemp crude extract through organic solvent extraction such as ethanol and hexane etc. Although a winterization process can remove a large quantity of waxes from the hemp crude extract, the winterization process inevitably wastes a large amount of ethanol and is uncapable of thoroughly clearing up the wax effectively, wherein the observation of the viscosity of extract is still high with inferior fluidity at room temperature after repeated winterization.

It is an objective of the present invention to provide a solution to the aforementioned problems, drawbacks, and issues associated with the extraction process of CBD. The present invention comprises a novel method of removing wax and terpene from the wild hemp plants including Da Hinggan Ling wild hemps for producing the enriched CBD crude oil with high quality and further purifying the crude oil into CBD crystal/isolate with 99.0% content.

SUMMARY OF THE INVENTION

The present invention comprises a novel method of removing wax and terpene from the wild hemp plants including Da Hinggan Ling wild hemps for producing the enriched cannabidiol (CBD) crude oil with high quality and further purifying it into crystal/isolate with 99.0% content of CBD. The method and process of the present invention utilizes titanium dioxide ($TiO_2$) photocatalyst for redox reaction under the irradiation of UV (ultraviolet) light in a solvent extraction process of CBD, which significantly removes accompanying wax and terpene. With the beneficial photocatalyst property, the $TiO_2$ nanoparticles of the present invention can decompose the wax and terpene in the wild hemp crude extract through appropriate UV radiation to induce catalytic reaction at specific PH (potential hydrogen) levels. Further, through optimizing the size, amount, and photocatalyst conditions of $TiO_2$ nanoparticles and films, the present invention achieves the best dewaxing effect and maximum terpene reduction. Thus, the present invention offers a low-cost, reusable, and biologically friendly method of removing wax and terpene using the $TiO_2$ photocatalyst to maximize the efficiency and effectiveness of the separation processes in the CBD production.

DETAIL DESCRIPTIONS OF THE INVENTION

All illustrations of the drawings are for the purpose of describing selected versions of the present invention and are not intended to limit the scope of the present invention.

The present invention comprises a method for producing cannabidiol oil of high quality and purity using photocatalysis to remove wax and terpene from the wild hemp plants including Da Hinggan Ling wild hemps. The method of the present invention can purify the resulting CBD crude oil into CBD crystal/isolate with 99.0% content. Additionally, the method and process of the present invention utilizes titanium dioxide ($TiO_2$) photocatalyst redox reaction under the irradiation of UV (ultraviolet) light in a solvent extraction process of CBD, which significantly removes accompanying wax and terpene. Titanium dioxide is widely used in the industry due to the beneficial photocatalyst property. By generating active radical oxygen species, $OH^-$, $O^{-2}$, $H_2O_2^{-2}$, etc., with the irradiation of visible or invisible light, films and nanoparticles of $TiO_2$ can degrade polymers, pesticides, volatile organic compounds and keep the anti-fouling surface intact. More specifically, the $TiO_2$ nanoparticles can decompose the wax and terpene in the hemp crude extract through appropriate UV radiation to induce catalytic reaction at specific PH (potential hydrogen) levels. Further, the present invention optimizes the size, amount, and photocatalyst conditions of nanoparticles and films of $TiO_2$ to achieve the best de-waxing effect and maximum terpene reduction. Thus, the present invention offers a low-cost, reusable, and biologically friendly method of removing wax and terpene using the $TiO_2$ photocatalyst to maximize the efficiency and effectiveness of the separation processes in the CBD production.

Figure 1:
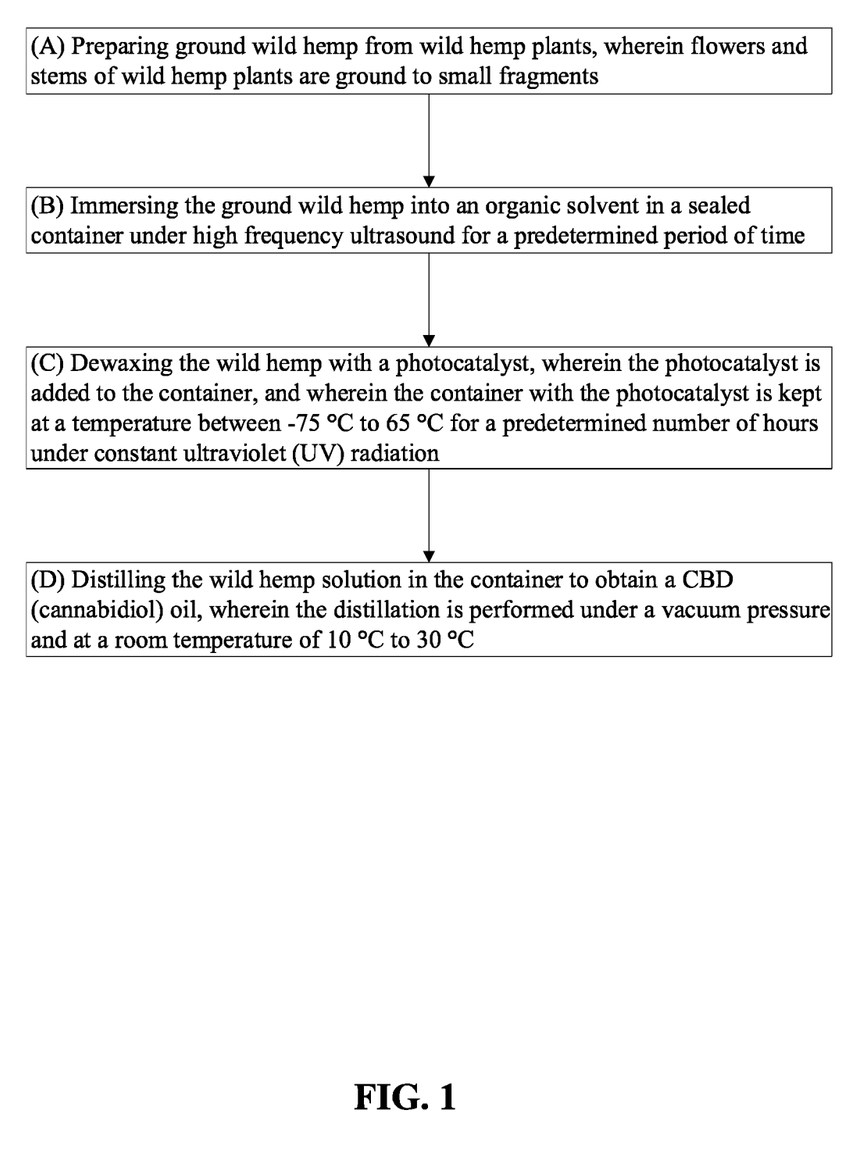
FIG. 1 is a flowchart of an overall process producing cannabidiol (CBD) of the present invention.

As can be seen in FIG. 1, the overall process of the method of the present invention starts with preparing ground wild hemp from wild hemp plants, wherein flowers and stems of wild hemp plants are ground to small fragments (Step A). Most often, the flowers and stems of the wild hemps, including, but not limited to, Da Hinggan Ling wild hemps, are delicately picked up from the primeval forest in the Da Hinggan Ling district without any pesticide or other harmful substance residue, are used in the Step A. Other parts of the wild hemp plant, however, may be used as well. Subsequently, the method immerses the ground wild hemp into an organic solvent in a sealed container under high frequency ultrasound for a predetermined period of time (Step B). The predetermined period of time can include, but is not limited to, at least one day, one to eight days, etc. This step is conducted at room temperature of 10° C. to 30° C. Then, the method performs dewaxing of the wild hemp with a photocatalyst, wherein the photocatalyst is added to the container, and wherein the container with the photocatalyst is kept at a temperature between −75° C. to 65° C. for a predetermined number of hours under constant ultraviolet (UV) radiation (Step C). The predetermined number of hours for this dewaxing step, Step C, can include, but is not limited to, at least three hours, three to seven hours, etc. The photocatalyst used in Step C for dewaxing the wild hemp in the solution can include, but is not limited to, metal photocatalyst, $TiO_2$ nanoparticles, $TiO_2$ nanotube films, ion doped $TiO_2$, etc. The mixture in the container is then filtered to obtain wild hemp solution after the dewaxing using the photocatalyst. The wild hemp solution is refined extract. Further, the method distills the wild hemp solution in the container to obtain a CBD (cannabidiol) oil, wherein the distillation is performed under a vacuum pressure and at a room temperature of 10° C. to 30° C. (Step D). In the preferred embodiment of the present invention, the distillation in Step D can be conducted at a vacuum pressure below 16.5 Torr and a temperature between 10° C. to 280° C. The good fluidity of the crude oil with low wax content can promote the efficiency of distillation through forming uniform membrane on the jacket wall. Thus, the CBD crude oil with photocatalyst dewaxing can achieve a high CBD content after one-stage distillation, with the increase between 40% to 85% from conventional processes. Thus, significantly high quality and purity CBD oil is acquired through this simple and cost-effective process of the present invention. Additionally, this process can achieve significant higher output than conventional methods.

Figure 2:
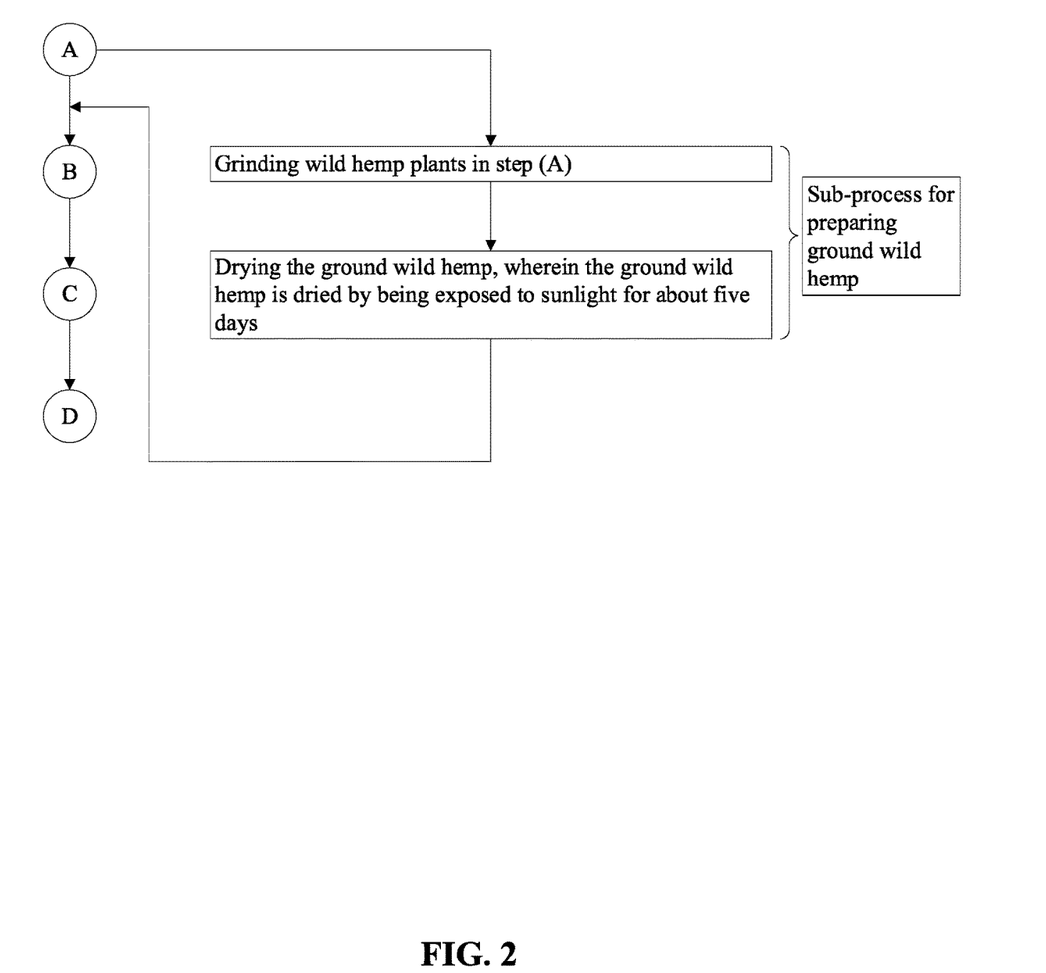
FIG. 2 is a flowchart of a sub-process for preparing ground wild hemp of the present invention.
Figure 3:
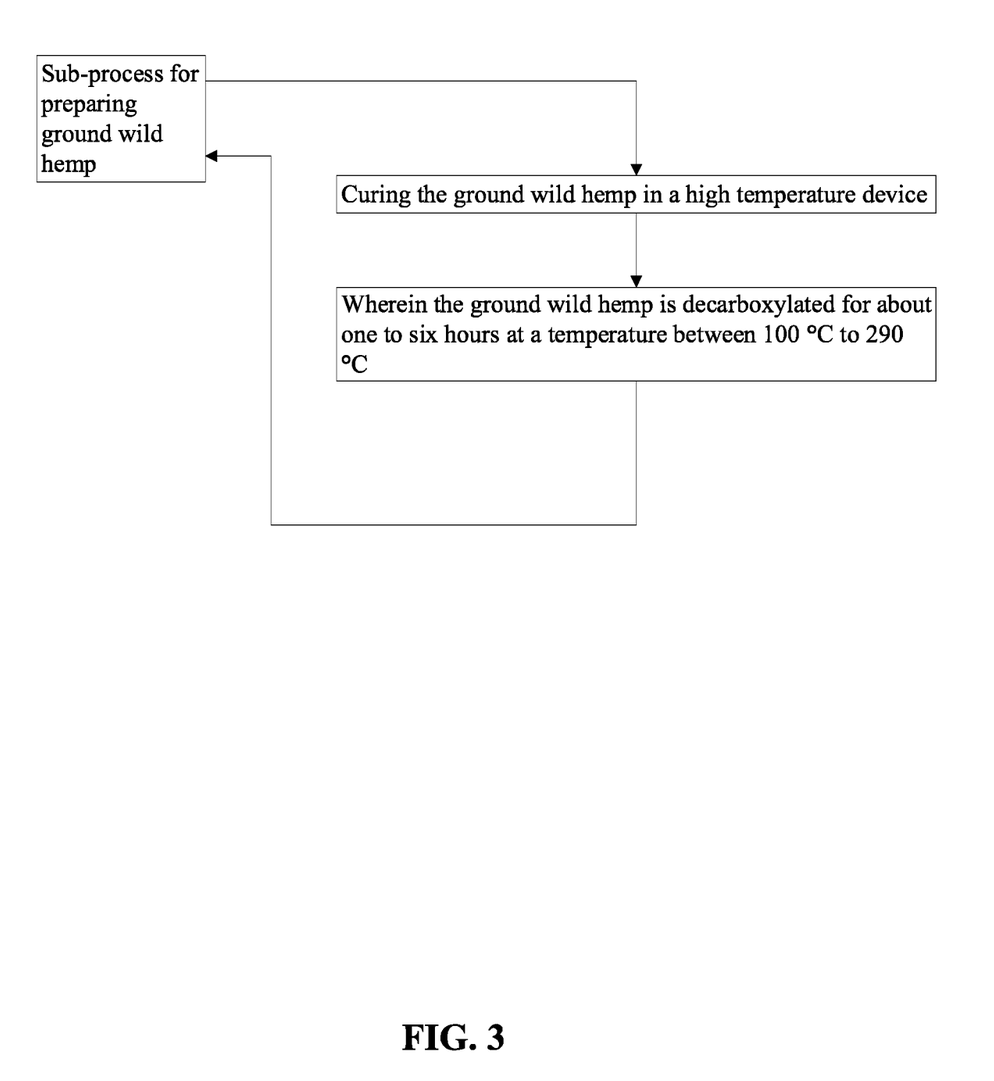
FIG. 3 is a flowchart of an alternative embodiment of the sub-process for preparing ground wild hemp of the present invention.

As can be seen in FIG. 2, the method of the present invention provides a sub-process for preparing ground wild hemp. More specifically, the method grinds wild hemp plants in Step A to obtain ground wild hemp and subsequently dries the ground wild hemp. In this sub-process, the ground wild hemp is dried by being exposed to sunlight for about five days. In an alternative embodiment of the present invention, the method may dry the ground wild hemp using other methods including, but not limited to, oven drying, drying in a furnace, drying in a heated chamber, etc. As can be seen in FIG. 3, in another embodiment of the present invention, the sub-process for preparing ground wild hemp comprises curing of the ground wild hemp. More specifically, the method cures the ground wild hemp in a high temperature device, wherein the ground wild hemp is decarboxylated for about one hour at a temperature between 100° C. to 290° C. The high temperature device can include, but is not limited to, an oven, a high temperature chamber, etc.

Figure 4:
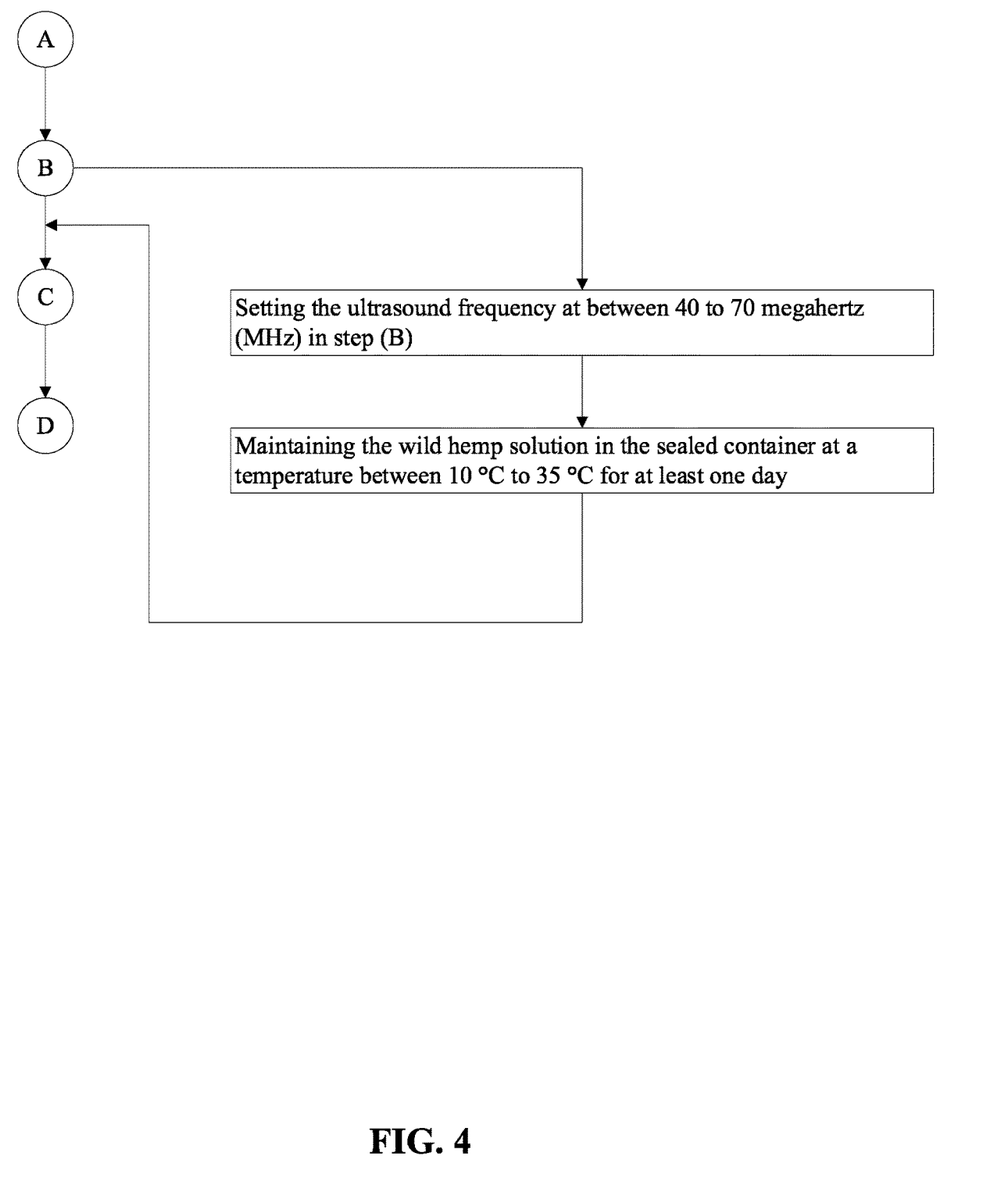
FIG. 4 is a flowchart of another embodiment of the sub-process for preparing ground wild hemp of the present invention.

As can be seen in FIG. 4, the method of the present invention provides a sub-process for ultrasound exposure for the wild hemp solution in Step B of the overall process. More specifically, the method sets the ultrasound frequency at between 40 to 70 megahertz (MHz) in Step B and maintains the wild hemp solution in the sealed container at a temperature between 10° C. to 35° C. for at least one day.

Figure 5:
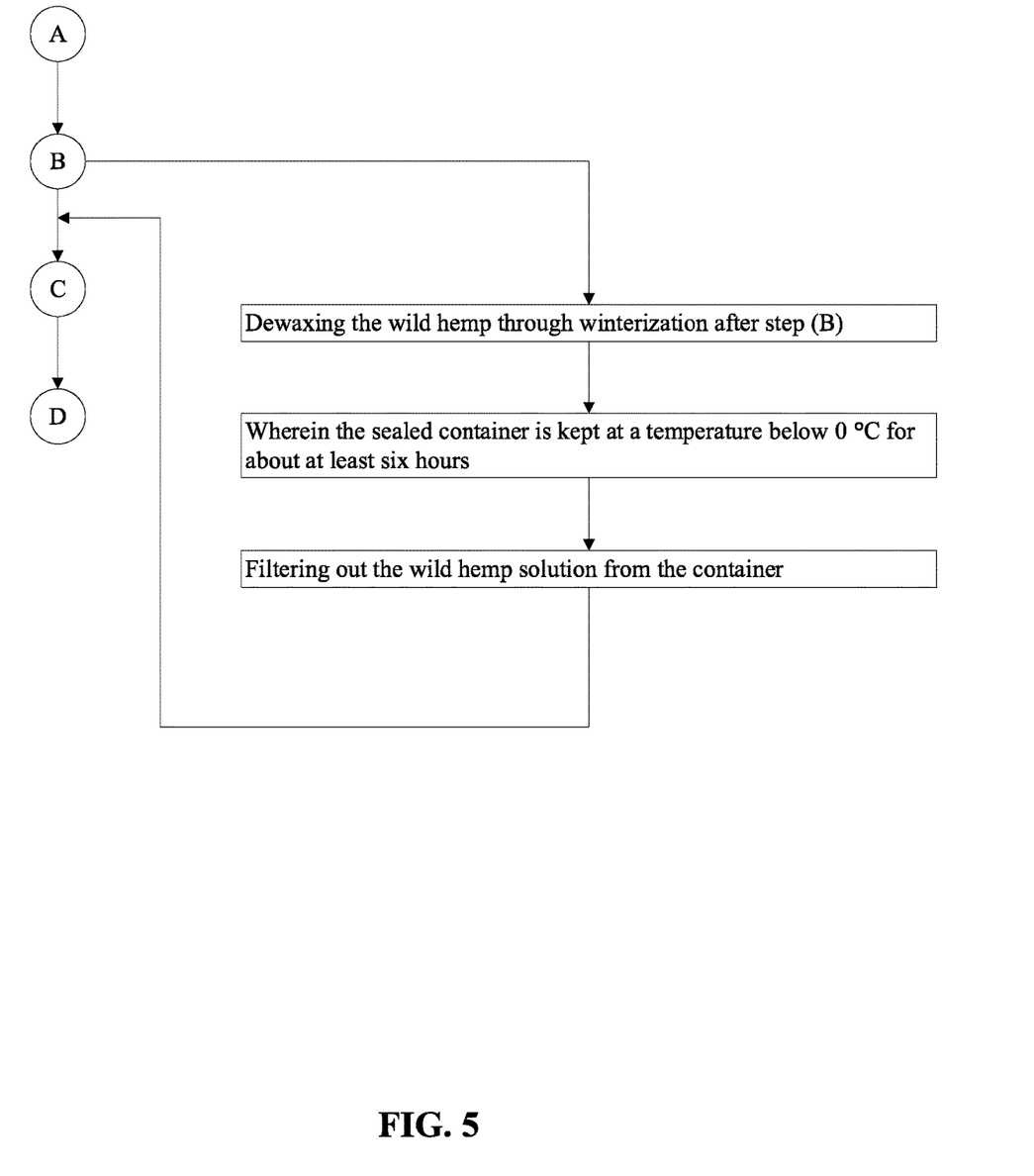
FIG. 5 is a flowchart of a sub-process for dewaxing the wild hemp through winterization of the present invention.

As can be seen in FIG. 5, the method of the present invention provides a sub-process for dewaxing the wild hemp through winterization. More specifically, the method performs dewaxing the wild hemp through winterization after Step B, wherein the sealed container is kept at a temperature below 0° C. for about at least six hours. Subsequently, the method filters out the wild hemp solution from the container after winterization is complete.

Figure 6:
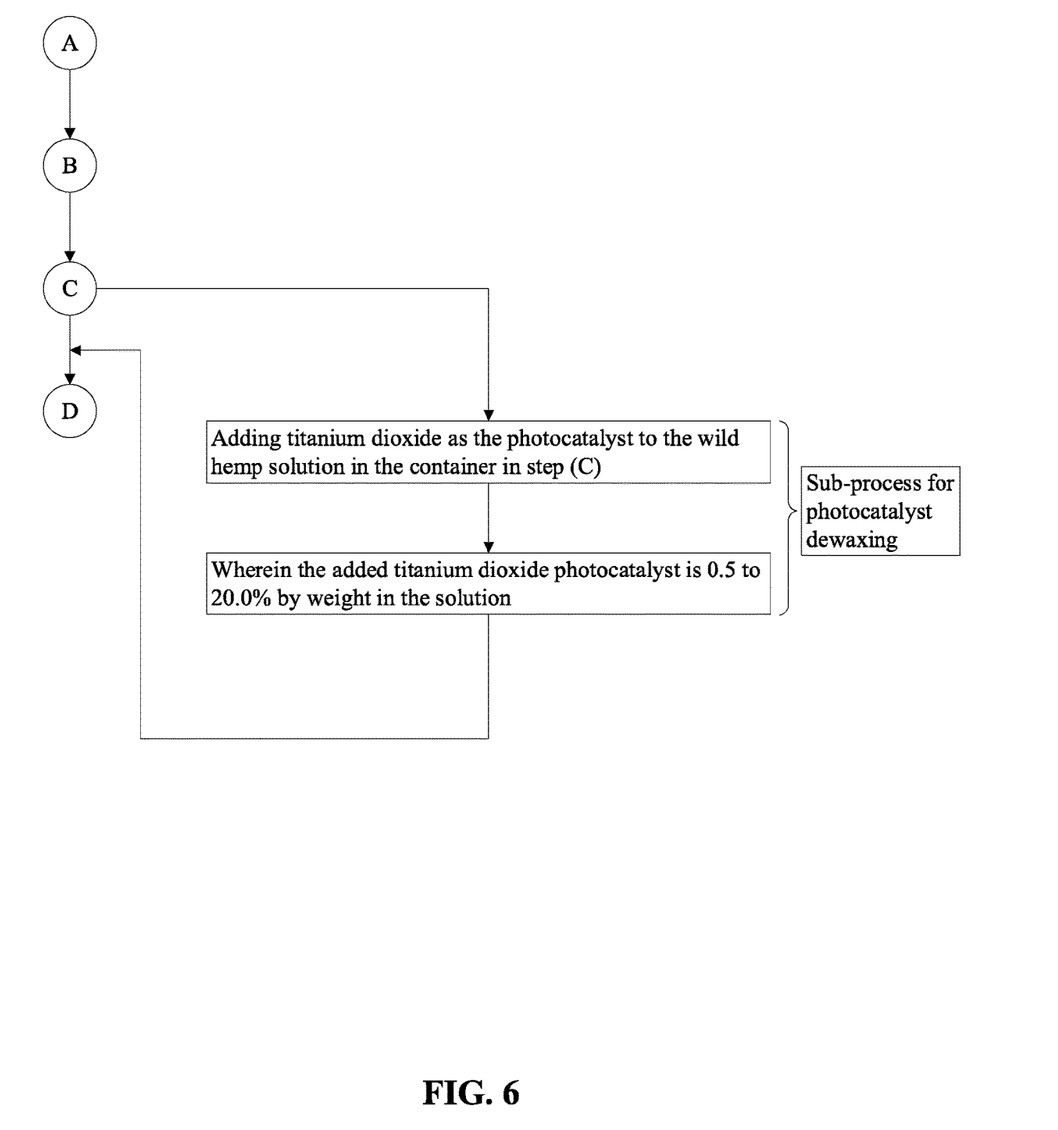
FIG. 6 is a flowchart of a sub-process for photocatalyst dewaxing of the present invention.
Figure 7:
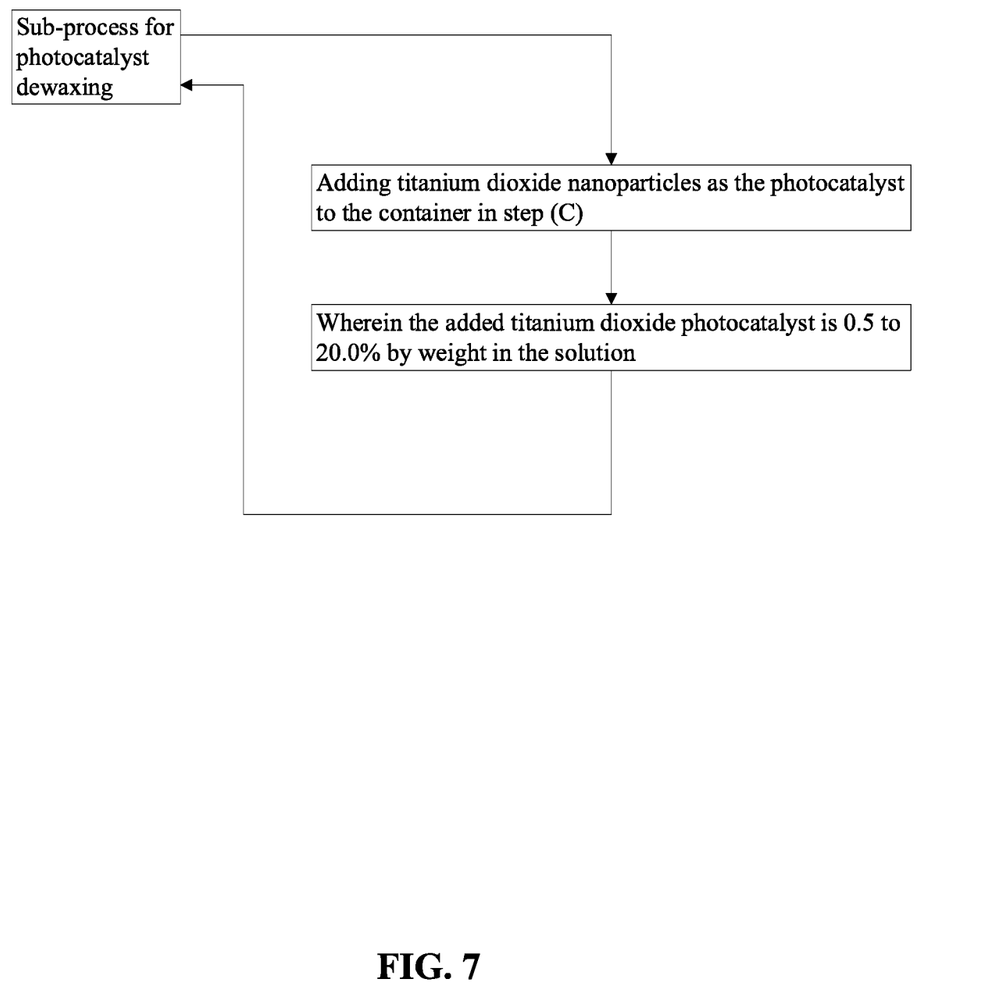
FIG. 7 is a flowchart of the sub-process for photocatalyst dewaxing using titanium dioxide nanoparticles of the present invention.
Figure 8:
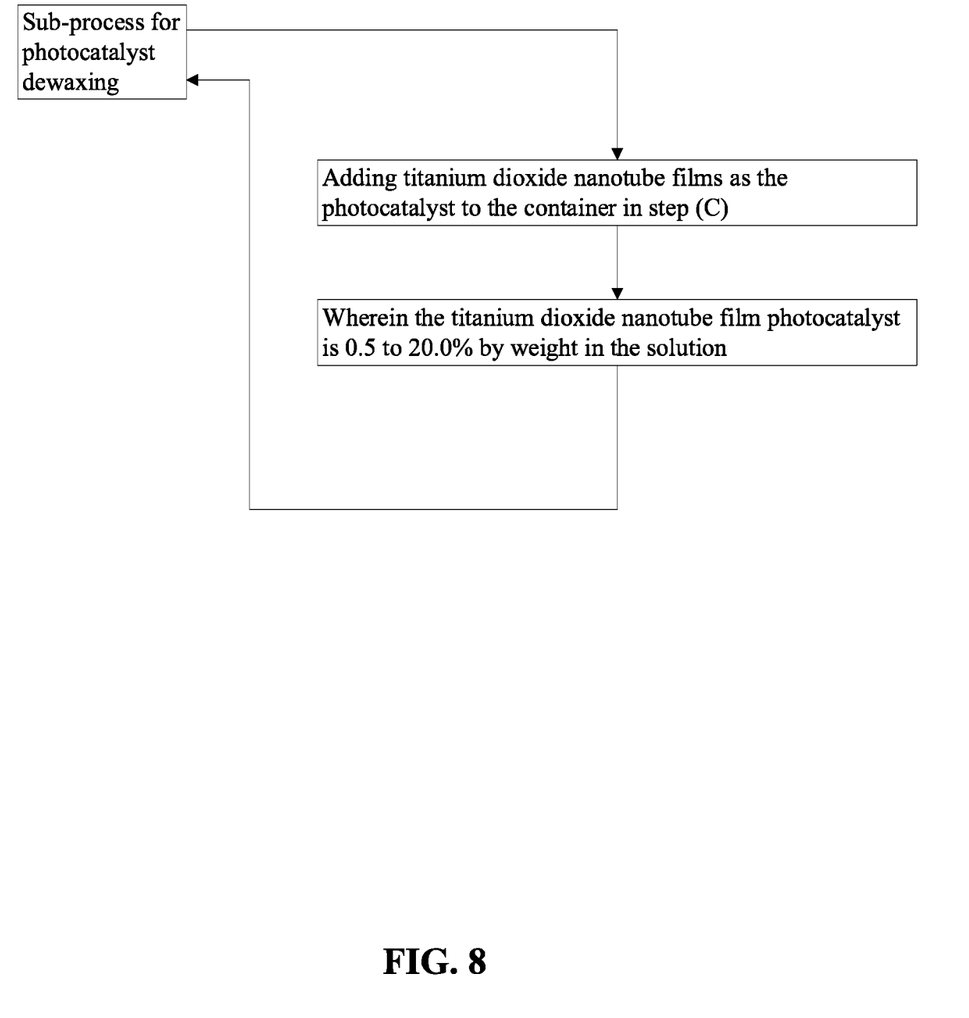
FIG. 8 is a flowchart of the sub-process for photocatalyst dewaxing using titanium dioxide nanotube films of the present invention.
Figure 9:
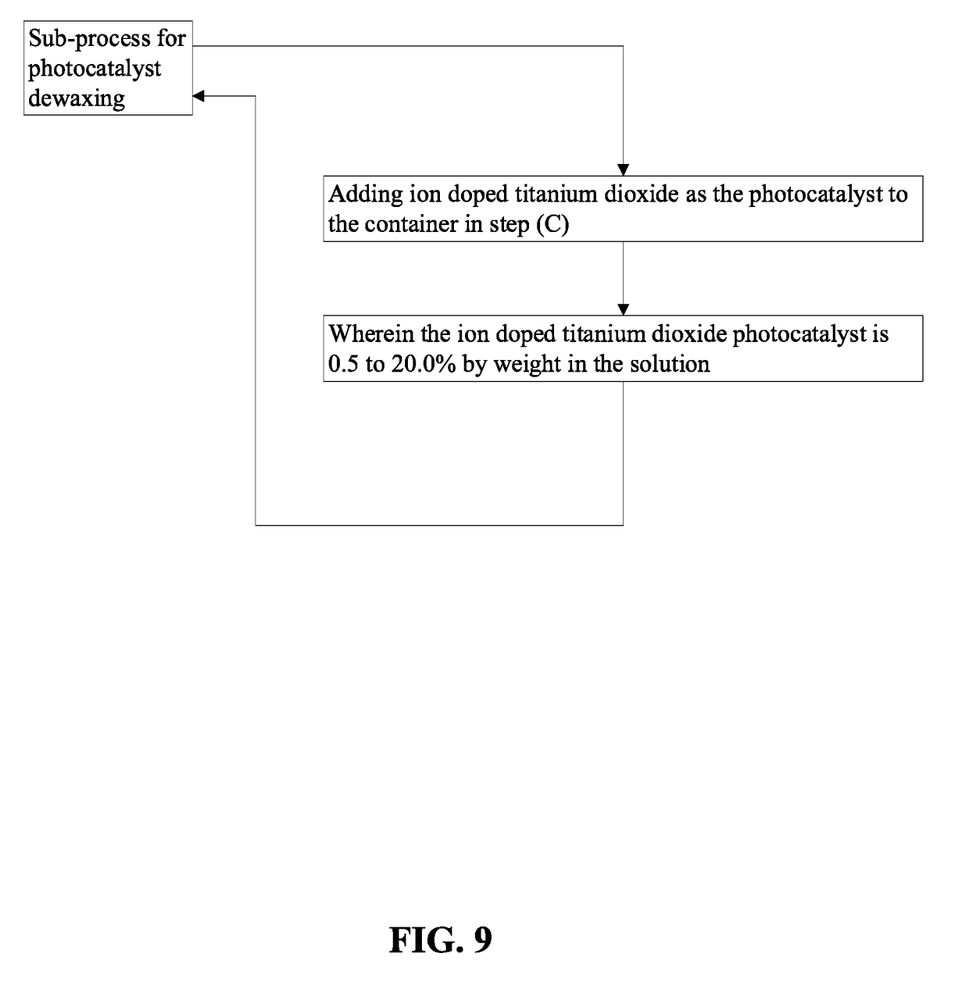
FIG. 9 is a flowchart of the sub-process for photocatalyst dewaxing using ion doped titanium dioxide of the present invention.
Figure 10:
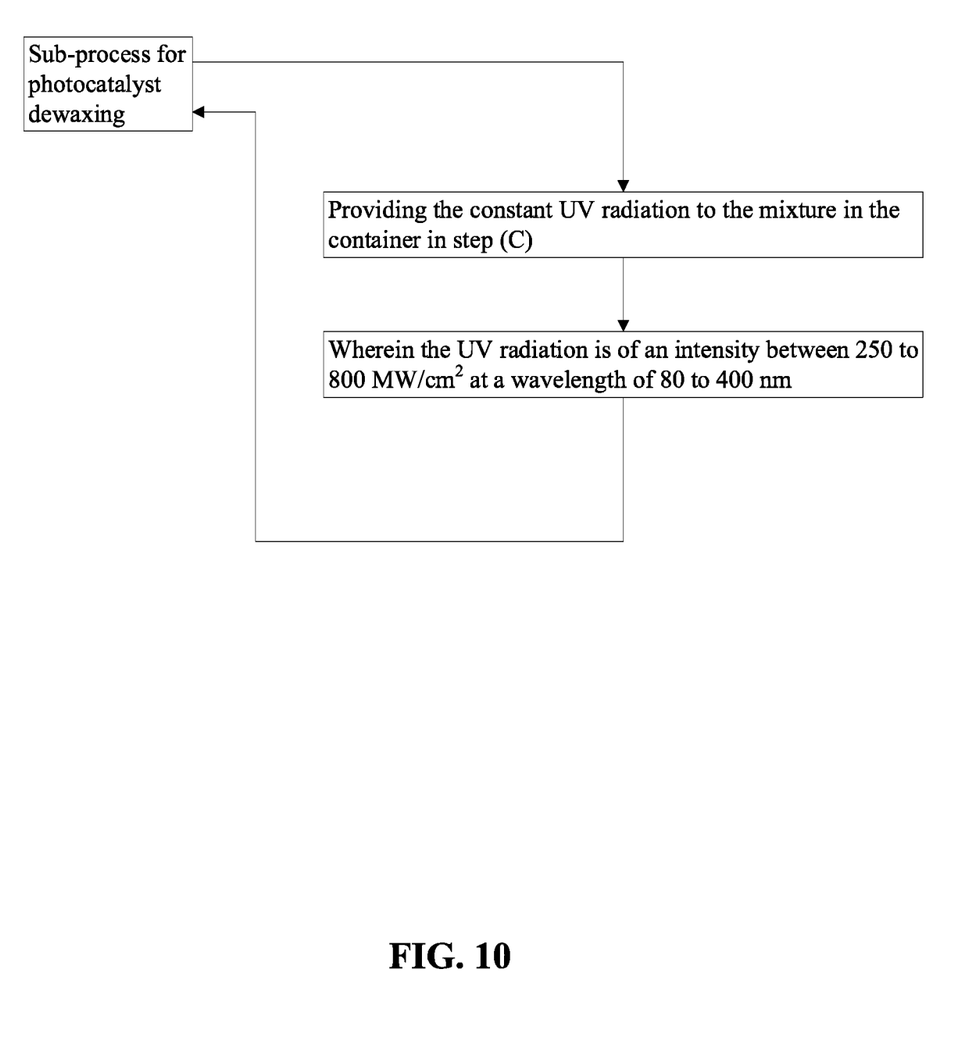
FIG. 10 is a flowchart of the sub-process for photocatalyst dewaxing using constant ultraviolet (UV) radiation of the present invention.
Figure 11:
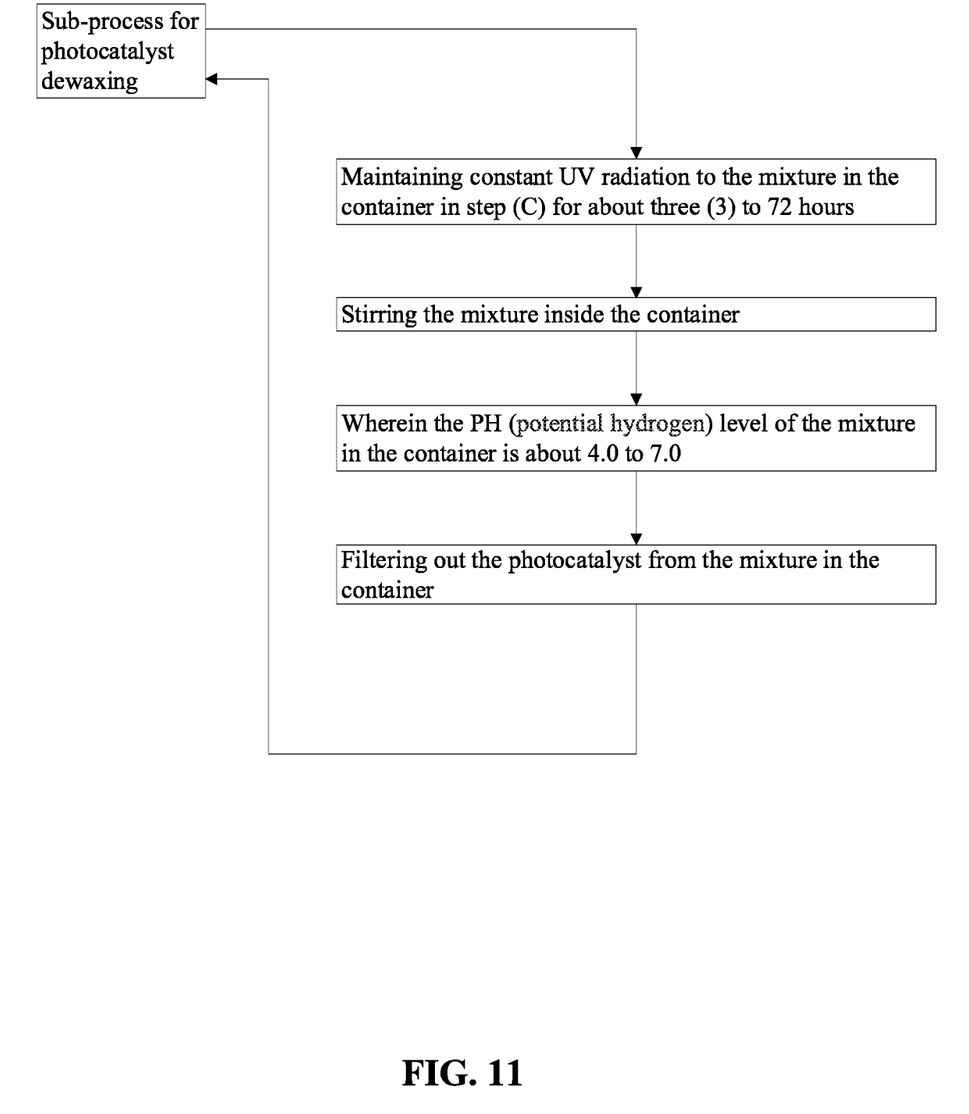
FIG. 11 is a flowchart of the sub-process for photocatalyst dewaxing through stirring the wild hemp solution at room temperature of the present invention.

As can be seen in FIG. 6, the method of the present invention provides a sub-process for photocatalyst dewaxing. More specifically, the method adds titanium dioxide ($TiO_2$) as the photocatalyst to the wild hemp solution in the container in Step C, wherein the added titanium dioxide photocatalyst is 0.5% to 20.0% by weight in the solution. As can be seen in FIG. 7, in an alternative embodiment of the present invention, the sub-process for dewaxing wild hemp using photocatalyst, wherein the photocatalyst comprises titanium dioxide nanoparticles. In the preferred embodiment of the present invention, the average size of $TiO_2$ nanoparticles can include, but is not limited to, 20 to 35 nm. As can be seen in FIG. 8, in another embodiment of the present invention, the sub-process for dewaxing wild hemp using photocatalyst, wherein the photocatalyst comprises titanium dioxide nanotube films. More specifically, the $TiO_2$ nanotube films may be applied to the container as, but not limited to, a coating, laminate, surface layer, etc. As can be seen in FIG. 9, in yet another embodiment of the present invention, the sub-process for dewaxing wild hemp using photocatalyst, wherein the photocatalyst comprises ion doped titanium dioxide. The ions used in the method can include, but are not limited to, Cu ion, Ag ion, N ion, Si ion, etc. Additionally, the ion doped $TiO_2$ photocatalyst includes, but is not limited to, iron doping ($Fe_2O_3$) titanium dioxide nanoparticles, wherein the average size of iron doping ($Fe_2O_3$) $TiO_2$ nanoparticles includes, but is not limited to, 30 to 40 nm. As can be seen in FIG. 10, the sub-process for dewaxing wild hemp using photocatalyst provides the constant UV radiation to the wild hemp solution in the container in Step C, wherein the UV radiation is of an intensity between 250 to 800 $MW/cm^2$ at a wavelength of 80 to 400 nm. As can be seen in FIG. 11, the sub-process for dewaxing wild hemp using photocatalyst maintains constant UV radiation to the wild hemp solution in the container in Step C for about three (3) to 72 hours while stirring the wild hemp solution inside the container, wherein the PH (potential hydrogen) level of the wild hemp solution in the container is about 4.0 to 7.0. Subsequently, the method filters out the photocatalyst from the mixture in the container. The stirring can be conducted using a device including, but not limited to, an agitator, a stirrer, a blender, a mixer, etc.

Figure 12:
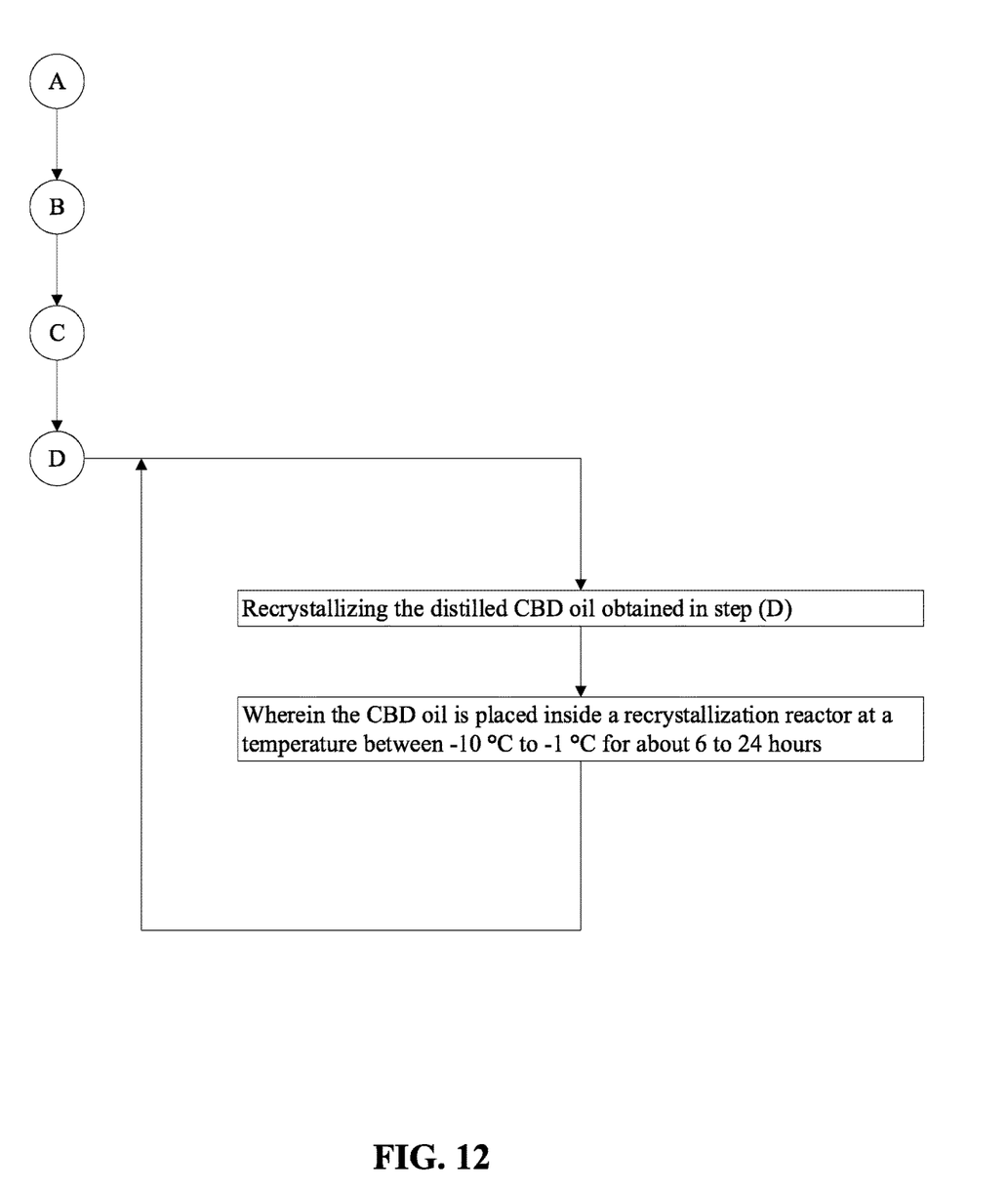
FIG. 12 is a flowchart of a sub-process for recrystallizing the distilled CBD oil of the present invention.

As can be seen in FIG. 12, the method of the present invention provides a sub-process for recrystallizing the distilled CBD oil. More specifically, the method recrystallizes the distilled CBD oil obtained in Step D, wherein the CBD oil is placed inside a recrystallization reactor at a temperature between −10° C. to −1° C. for about 6 to 24 hours. More specifically, the recrystallization sub-process is implemented to achieve the highly purified CBD isolate with more than 99.5% CBD content in the extract through placing the distilled CBD oil obtained in Step D into a recrystallization reactor to facilitate slow cooling and drying of the CBD oil within 6 to 24 hours. The viscosity of the resulting CBD oil extract can decrease significantly indicating high dewaxing effectiveness. Additionally, the method of the present invention can achieve about 55% to 85% content of CBD in the CBD oil extract through the one-stage distillation, as compared to 40% obtained by most of conventional processes which do not have a photocatalysis dewaxing process. Further, the terpene residue in the resulting CBD oil extract is minimized or eliminated as measured by a high-performance liquid chromatography (HPLC) method at a temperature of 25° C. Thus, the CBD isolate by the present invention is achieved with no terpene adhered onto the crystal surface.

Although the invention has been explained in relation to its preferred embodiment, it is to be understood that many other possible modifications and variations can be made without departing from the spirit and scope of the invention as hereinafter claimed.

What is claimed is:

1. A method for producing cannabidiol oil of high quality and purity using photocatalysis comprising the steps of:
    (A) preparing ground wild hemp from wild hemp plants, wherein flowers and stems of wild hemp plants are ground to small fragments;
    (B) immersing the ground wild hemp into an organic solvent to form a wild hemp solution, wherein the wild hemp solution is placed in a sealed container under high frequency ultrasound for a predetermined period of time;
    (C) dewaxing the wild hemp with a photocatalyst, wherein the photocatalyst is added to the wild hemp solution in the container, and wherein the wild hemp solution with the photocatalyst is kept at a temperature between −75° C. to 65° C. for a predetermined number of hours under a constant ultraviolet (UV) radiation; and
    (D) distilling the wild hemp solution in the container to obtain a CBD (cannabidiol) oil, wherein the distillation is performed under a vacuum pressure and at a room temperature of 10° C. to 30° C.

2. The method for producing cannabidiol oil of high quality and purity using photocatalysis as claimed in claim 1, wherein the wild hemp plants comprise Da Hinggan Ling wild hemps.

3. The method for producing cannabidiol oil of high quality and purity using photocatalysis as claimed in claim 1 comprising the steps of:
    grinding wild hemp plants in step (A); and
    drying the ground wild hemp, wherein the ground wild hemp is dried by being exposed to sunlight for about five days.

4. The method for producing cannabidiol oil of high quality and purity using photocatalysis as claimed in claim 1 comprising the steps of:
    curing the ground wild hemp in step (A) in a high temperature device; and
    wherein the ground wild hemp is decarboxylated for about one to six hours at a temperature between 100° C. to 290° C.

5. The method for producing cannabidiol oil of high quality and purity using photocatalysis as claimed in claim 1 comprising the steps of:
    setting the ultrasound frequency at between 40 to 70 megahertz (MHz) in step (B); and
    maintaining the wild hemp solution in the sealed container at a temperature between 10° C. to 35° C. for at least one day.

6. The method for producing cannabidiol oil of high quality and purity using photocatalysis as claimed in claim 1 comprising the steps of:
    dewaxing the wild hemp through winterization after step (B);
    wherein the sealed container is kept at a temperature below 0° C. for about at least six hours; and
    filtering out the wild hemp solution from the container.

7. The method for producing cannabidiol oil of high quality and purity using photocatalysis as claimed in claim 1 comprising the steps of:
    adding titanium dioxide as the photocatalyst to the wild hemp solution in the container in step (C); and
    wherein the added titanium dioxide photocatalyst is 0.5 to 20.0% by weight in the wild hemp solution.

8. The method for producing cannabidiol oil of high quality and purity using photocatalysis as claimed in claim 7, wherein the photocatalyst comprises titanium dioxide nanoparticles.

9. The method for producing cannabidiol oil of high quality and purity using photocatalysis as claimed in claim 7, wherein the photocatalyst comprises titanium dioxide nanotube films.

10. The method for producing cannabidiol oil of high quality and purity using photocatalysis as claimed in claim 7, wherein the photocatalyst comprises ion doped titanium dioxide.

11. The method for producing cannabidiol oil of high quality and purity using photocatalysis as claimed in claim 7 comprising the steps of:
    providing the constant UV radiation to the wild hemp solution in the container in step (C); and wherein the UV radiation is of an intensity between 250 to 800 MW/cm$^2$ at a wavelength of 80 to 400 nm.

12. The method for producing cannabidiol oil of high quality and purity using photocatalysis as claimed in claim 7 comprising the steps of:

maintaining the constant UV radiation to the wild hemp solution in the container in step (C) for about three (3) to 72 hours;

stirring the wild hemp solution;

wherein the PH (potential hydrogen) level of the wild hemp solution is about 4.0 to 7.0; and filtering out the photocatalyst from the wild hemp solution.

13. The method for producing cannabidiol oil of high quality and purity using photocatalysis as claimed in claim 1 comprising the steps of:

recrystallizing the distilled CBD oil obtained in step (D); and wherein the CBD oil is placed inside a recrystallization reactor at a temperature between −10° C. to −1° C. for about 6 to 24 hours.

14. A method for producing cannabidiol oil of high quality and purity using photocatalysis comprising the steps of:

(A) preparing ground wild hemp from wild hemp plants, wherein flowers and stems of wild hemp plants are ground to small fragments;

(B) immersing the ground wild hemp into an organic solvent to form a wild hemp solution, wherein the wild hemp solution is placed in a sealed container under high frequency ultrasound for a predetermined period of time;

(C) dewaxing the wild hemp with a photocatalyst, wherein the photocatalyst is added to the wild hemp solution in the container, and wherein the wild hemp solution with the photocatalyst is kept at a temperature between −75° C. to 65° C. for a predetermined number of hours under a constant ultraviolet (UV) radiation;

(D) distilling the wild hemp solution in the container to obtain a CBD (cannabidiol) oil, wherein the distillation is performed under a vacuum pressure and at a room temperature of 10° C. to 30° C.; and (E) recrystallizing the distilled CBD oil obtained, wherein the CBD oil is placed inside a recrystallization reactor at a temperature between −10° C. to −1° C. for about 6 to 24 hours.

15. A method for producing cannabidiol oil of high quality and purity using photocatalysis comprising the steps of:

(A) preparing ground wild hemp from wild hemp plants, wherein flowers and stems of wild hemp plants are ground to small fragments;

(B) curing the ground wild hemp in a high temperature device, wherein the ground wild hemp is decarboxylated for about one to six hours at a temperature between 100° C. to 290° C.;

(C) immersing the cured ground wild hemp into an organic solvent to form a wild hemp solution, wherein the wild hemp solution is placed in a sealed container under high frequency ultrasound for a predetermined period of time;

(D) dewaxing the wild hemp in the wild hemp solution with a photocatalyst, wherein the photocatalyst is added to the wild hemp solution in the container, and wherein the wild hemp solution with the photocatalyst is kept at a temperature between −75° C. to 65° C. for a predetermined number of hours under a constant ultraviolet (UV) radiation;

(E) distilling the wild hemp solution in the container to obtain a CBD (cannabidiol) oil, wherein the distillation is performed under a vacuum pressure and at a room temperature of 10° C. to 30° C.; and (F) recrystallizing the distilled CBD oil obtained, wherein the CBD oil is placed inside a recrystallization reactor at a temperature between −10° C. to −1° C. for about 6 to 24 hours.

* * * * *